United States Patent
Shimon et al.

(10) Patent No.: US 12,348,368 B2
(45) Date of Patent: Jul. 1, 2025

(54) DATA HYGIENE FOR ASSET MANAGEMENT

(71) Applicant: Axonius Solutions Ltd., Tel-Aviv (IL)

(72) Inventors: Oded Eliyahu Shimon, Holon (IL); Guy Pergal, Herzliya (IL); Avidor Bartov, Tel-Aviv (IL)

(73) Assignee: Axonius Solutions Ltd., Tel-Aviv (IL)

( * ) Notice: Subject to any disclaimer, the term of this patent is extended or adjusted under 35 U.S.C. 154(b) by 241 days.

(21) Appl. No.: 17/990,838

(22) Filed: Nov. 21, 2022

(65) Prior Publication Data

US 2024/0171462 A1    May 23, 2024

(51) Int. Cl.
  *G06F 15/173*  (2006.01)
  *H04L 41/02*  (2022.01)
  *H04L 41/0823*  (2022.01)

(52) U.S. Cl.
  CPC ........ *H04L 41/0836* (2013.01); *H04L 41/024* (2013.01)

(58) Field of Classification Search
  CPC ................... H04L 41/0836; H04L 41/024
  See application file for complete search history.

(56) References Cited

U.S. PATENT DOCUMENTS

| | | | | |
|---|---|---|---|---|
| 11,620,556 | B2* | 4/2023 | Andreou | G06N 20/00 |
| | | | | 706/12 |
| 2017/0091692 | A1* | 3/2017 | Guo | G06V 10/761 |
| 2018/0332069 | A1* | 11/2018 | Moore | G06F 21/105 |
| 2020/0012733 | A1* | 1/2020 | Ding | G06F 16/2264 |

* cited by examiner

Primary Examiner — Padma Mundur (57) ABSTRACT

A method for producing a consistent dataset describing a computing environment, comprising: accessing at least one set of entity description records, each entity description record describing one of a plurality of entities of a computing environment, each entity description record comprising a plurality of attribute values each of one of a plurality of entity attributes; computing a plurality of reliability scores, each reliability score computed for an attribute value of the plurality of attribute values of an entity description record by: identifying at least one conflict between the attribute value and at least one other attribute value of at least one other entity description record; and computing the reliability score according to identifying the at least one conflict; and providing the plurality of reliability scores to at least one management software object for the purpose of performing at least one management operation pertaining to management of the computing environment.

17 Claims, 7 Drawing Sheets

DATA HYGIENE FOR ASSET MANAGEMENT

BACKGROUND

Some embodiments described in the present disclosure relate to an information technology (IT) infrastructure and, more specifically, but not exclusively, to a computing environment combining traditional IT technologies and cloud technologies.

Currently, organizations use a variety of tools and services to manage their computing environment. Historically, an IT infrastructure of an organization was made up of hardware and software components owned by the organization and installed on-premises. There is a growing use of cloud technologies, where computer system resources, for example computing power and data storage, are distributed over multiple locations and possibly shared between multiple organizations. Nowadays, some organizations have hybrid computing environments combining traditional IT technologies and cloud technologies.

As use herein, the term "network connected device" refers to an entity connected to a digital communication network and having an identifier unique within a management domain. Some examples of a network connected device are a computer, a network device, such as a router, and a virtual machine, executed by a host machine. Some additional examples of a network connected device are a computer peripheral device, such as a printer, a digital storage device, and a nonstandard computing device that connects to a network and has an ability to transmit data (commonly known as an Internet Of Things device), such as a thermostat, a light bulb controller, and an electrical switch. Some examples of a management domain are a device deployment domain and a security domain. For brevity, unless otherwise noted the term "device" is used herein to mean "network connected device" and the terms are used interchangeably.

As used herewithin, the term "user" refers to a person or computerized agent having an identifier unique within a user management domain. For example, a user may be an employee of the organization. Some example of a user management domain include a human resources management tool.

A computing environment comprises a plurality of entities. An entity may be a hardware component. An entity may be a software component. An entity may be a network connected device. An entity may be a user. As used herewithin, the terms "asset" and "entity" each refer to a hardware component, software component or user of a computing environment and the terms are used interchangeably.

Organizations use a variety of tools and services, henceforth referred to as "system management entities", to manage the plurality of entities of their computing environment.

The term "data hygiene" refers to increasing the accuracy and consistency of data in a dataset.

SUMMARY

It is an object of some embodiments described in the present disclosure to provide a system and a method for providing a consistent dataset describing a computing environment, where the dataset comprises a plurality of entity description records, each describing one of a plurality of entities of the computing environment. In some such embodiments a plurality of reliability scores computed each for one of a plurality of attribute values of one of the plurality of entity description records is provided to one or more management software objects for the purpose of performing one or more management operations pertaining to management of the computing environment. Optionally, a reliability score is computed according to identifying one or more conflicts between an attribute value of an entity description record and at least one other attribute value of at least one other entity description record. Using a reliability score facilitates selecting which data to use when performing a management operation and selecting which management operation to perform, increasing reliability of the computing environment and increasing accuracy of the resulting dataset when the management operation pertains to cleaning the dataset. Computing a reliability score according to identifying the one or more conflicts increases the accuracy of the reliability score, and thus increases the accuracy of the resulting dataset.

The foregoing and other objects are achieved by the features of the independent claims. Further implementation forms are apparent from the dependent claims, the description and the figures.

According to a first aspect, a method for producing a consistent dataset describing a computing environment comprises: accessing at least one set of entity description records, each entity description record describing one of a plurality of entities of a computing environment, each entity description record comprising a plurality of attribute values each of one of a plurality of entity attributes; computing a plurality of reliability scores, each reliability score computed for an attribute value of the plurality of attribute values of an entity description record of the at least one set of entity description records by: identifying at least one conflict between the attribute value and at least one other attribute value of at least one other entity description record; and computing the reliability score according to identifying the at least one conflict; and providing the plurality of reliability scores to at least one management software object for the purpose of performing at least one management operation pertaining to management of the computing environment.

According to a second aspect, a system for producing a consistent dataset describing a computing environment comprises at least one hardware processor configured for: accessing at least one set of entity description records, each entity description record describing one of a plurality of entities of a computing environment, each entity description record comprising a plurality of attribute values each of one of a plurality of entity attributes; computing a plurality of reliability scores, each reliability score computed for an attribute value of the plurality of attribute values of an entity description record of the at least one set of entity description records by: identifying at least one conflict between the attribute value and at least one other attribute value of at least one other entity description record; and computing the reliability score according to identifying the at least one conflict; and providing the plurality of reliability scores to at least one management software object for the purpose of performing at least one management operation pertaining to management of the computing environment.

According to a third aspect, a software program product for producing a consistent dataset describing a computing environment comprises: a non-transitory computer readable storage medium; first program instructions for accessing at least one set of entity description records, each entity description record describing one of a plurality of entities of a computing environment, each entity description record comprising a plurality of attribute values each of one of a plurality of entity attributes; second program instructions for computing a plurality of reliability scores, each reliability score computed for an attribute value of the plurality of attribute values of an entity description record of the at least one set of entity description records by: identifying at least one conflict between the attribute value and at least one other attribute value of at least one other entity description record; and computing the reliability score according to identifying the at least one conflict; and third program instructions for providing the plurality of reliability scores to at least one management software object for the purpose of performing at least one management operation pertaining to management of the computing environment; wherein the first, second, and third program instructions are executed by at least one computerized processor from the non-transitory computer readable storage medium.

With reference to the first and second aspects, in a first possible implementation of the first and second aspects identifying the at least one conflict comprises: computing a graph comprising a plurality of nodes and a plurality of edges, where each of the plurality of nodes represents one of the plurality of entities of the computing environment and each of the plurality of edges represents one of the plurality of attribute values; and identifying in the graph at least one conflict between at least one edge of the plurality of edges representing the attribute value and at least one other edge of the plurality of edges representing the at least one other attribute value. Identifying connectivity in a graph structure is faster and more accurate than identifying connectivity by scanning the plurality of records, increasing accuracy of identifying connectivity between the plurality of entities and thus increasing accuracy of identifying the one or more conflicts, and thus increasing accuracy of a reliability score computed according to the identified conflicts. Increasing accuracy of the reliability score increases accuracy of the one or more management operation and thus increases reliability of the computing environment. In addition, using a graph allows identifying sophisticated relationships between a plurality of connections between the plurality of entities that cannot be identified by scanning the plurality of records, further increasing accuracy of identifying the one or more conflicts.

With reference to the first and second aspects, in a second possible implementation of the first and second aspects each of the entity description record and the at least one other entity description record comprise at least one first common entity attribute of the plurality of entity attributes and at least one second common entity attribute of the plurality of entity attributes. Optionally, identifying the at least one conflict comprises: identifying that at least one first attribute value of the at least one first common entity attribute in the entity description record is equal, according to a first value comparison test, to at least one other first attribute value of the at least one first common entity attribute in each of the at least one other entity description records; and identifying that at least one second attribute value of the at least one second common entity attribute in the entity description record is not equal, according to a second value comparison test, to at least one other second attribute value of the at least one second common entity attribute in each of the at least one other entity description records. Identifying two or more records that share one or more entity attribute values for one or more entity attributes and have different entity attribute values for one or more other entity attributes increases accuracy of identifying the one or more conflicts, and thus increases accuracy of a reliability score computed according to the one or more identified conflicts. Optionally, the attribute value is a value of one of the at least one first common entity attribute. Optionally, the attribute value is a value of one of the at least one second common entity attribute. Optionally, an amount of the at least one other entity description records exceeds an identified threshold value. Optionally, the plurality of entities comprises a plurality of devices and the at least one first common entity attribute comprises at least one of: a serial number of a device of the plurality of devices, a host-name of a device of the plurality of devices, a media access control (MAC) address of a device of the plurality of devices, an internet protocol (IP) address of a device of the plurality of devices, a cloud identifier of a device of the plurality of devices, and an operating system of a device of the plurality of devices. Optionally, the at least one second common entity attribute comprises at least one of: a serial number of a device of the plurality of devices, a host-name of a device of the plurality of devices, a manufacturer of a device of the plurality of devices, a MAC address of a device of the plurality of devices, an IP address of a device of the plurality of devices, a cloud identifier of a device of the plurality of devices, and an operating system of a device of the plurality of devices. Optionally, the plurality of entities comprises a plurality of users and the at least one first common entity attribute comprises at least one of: a username of a user of the plurality of users, an electronic mail address of a user of the plurality of users, and an employee identification number of a user of the plurality of users. Optionally, the at least one second common entity attribute comprises at least one of: a username of a user of the plurality of users, an electronic mail address of a user of the plurality of users, and an employee identification number of a user of the plurality of users. Optionally, each of the entity description record and the at least one other entity description record comprise at least one first common entity attribute of the plurality of entity attributes, the attribute value is a third attribute value of a third entity attribute of a first entity description record of the at least one other entity description record, and one of the at least one other attribute value is a fourth attribute value of a fourth entity attribute of a second entity description record of the at least one other entity description record. Optionally, identifying the at least one conflict comprises: identifying that at least one first attribute value of the at least one first common entity attribute in the entity description record is equal, according to a first value comparison test, to at least one other first attribute value of the at least one first common entity attribute in each of the at least one other entity description records, and identifying a conflict between the third attribute value and the fourth attribute value, according to a third value comparison test comprising the third entity attribute, the third attribute value, the fourth entity attribute and the fourth attribute value. Identifying an attribute value of an entity attribute that is in conflict with other attribute values of other entity attributes increases accuracy of identifying the one or more conflicts, and thus increases accuracy of the reliability score computed according to the identified one or more conflicts.

With reference to the first and second aspects, in a third possible implementation of the first and second aspects performing the at least one management operation comprises computing a classification for at least one of the plurality of reliability scores, where the classification is one of a plurality of reliability classes. Optionally, the at least one management operation is performed according to the classification of at least one reliability score of at least one attribute value of the plurality of attribute values of at least one entity description record of the plurality of entity description records. Performing the one or more management operations according to one or more classifications of one or more reliability scores of the one or more attribute values increases the likelihood that the one or more management operations address an inconsistency in the plurality of entity description records, thus increasing reliability of the computing environment described by the plurality of entity description records. Optionally, for each of at least one of the plurality of reliability scores, computing the reliability score further comprises computing at least one justification value according to the at least one conflict according to which the reliability score was computed, and providing the plurality of reliability scores to the at least one management software object further comprises providing the at least one justification value in association with the reliability score. Optionally, performing the at least one management operation comprises computing a classification of at least one of the plurality of reliability scores, where the classification is one of a plurality of reliability classes, and computing the classification is further according to the at least one of the plurality of reliability scores is further according to the one or more justification values associated with the at least one reliability score. Using one or more justification values for classifying the one or more reliability scores increases accuracy of the classification, thus increasing accuracy of the one or more management operations performed according to the classification, thus increasing reliability of the computing environment. Optionally, the at least one management operation comprises at least one of: removing at least one entity description record from the at least one set of entity description records; modifying at least one other entity description record in the at least one set of entity description records; in a repository comprising a plurality of entity descriptors, each describing one of the plurality of entities of the computing environment, splitting at least one of the entity descriptors into at least two entity descriptors comprising one entity descriptor describing a first entity of the plurality of entities and another entity descriptor describing a second entity of the plurality of entities; displaying the plurality of reliability scores to at least one user in a graphical user interface of the at least one management software object; sending at least one alert to at least one other user; modifying at least one system value of at least one device of a plurality of devices of the plurality of entities; and generating a report comprising at least some of the plurality of reliability scores. Optionally, for at least one of the plurality of reliability scores displaying the reliability score comprises displaying one or more display values, where at least one of the one or more display values is selected from: the reliability score, the attribute value for which the reliability score was computed, the entity attribute of the attribute value, and a justification value associated with the reliability score. Optionally, performing the at least one management operation further comprises providing the at least one user with an interface to select at least one other of the one or more display values and select the at least one management operation. Displaying to one or more users any one or any combination of a reliability score, an attribute value, an entity attribute and a justification value increases usability of the system for managing the computing environment, thus increasing reliability of the computing environment. Optionally, the at least one management operation additionally or alternatively comprises at least one of: generating a query comprising the at least one other display value, storing the query, and instructing execution of an identified script. Generating a query comprising a display value and additionally or alternatively executing a script increase usability of the system for managing the computing environment, thus increasing reliability of the computing environment.

With reference to the first and second aspects, in a fourth possible implementation of the first and second aspects accessing the at least one set of entity description records comprises accessing at least one system management entity of the computing environment. Accessing one or more system management entities of the computing environment increases accuracy of the one or more identified conflicts, thus increasing accuracy of the one or more reliability scores, which increases accuracy of the one or more management operations and thus increases reliability of the computing environment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

A system management entity may provide false information regarding one or more of a computing environment's plurality of entities. Sometimes information is duplicated. In addition, information may be exposed to human errors, for example when information is provided via a comma-separated-values (CSV) file. As a result, a set of entity description records provided by a system management entity may contain inaccurate, inconsistent and even corrupt values.

As mentioned above, organizations use a variety of system management entities to manage the plurality of entities of their computing environment, which increases the likelihood of discrepancies between data provided by one system management entity and other data provided by another system management entity. For example, when an entity is associated with more than one management domain, information may be duplicated. However, duplicated information may be inconsistent.

To manage the plurality of entities of the computing environment correctly, there is a need to increase the accuracy and consistency of data across a plurality of system management entities. Some simple methods include checking syntactic properties of an attribute value of an entity description record. For example, when an attribute value is a media access control (MAC) address of a network connected device, an attribute value that does not have 6 hexadecimal octets may be considered invalid. However, checking syntactic properties does not detect semantic discrepancies, for example a computer associated with more than one manufacturer.

To produce a consistent dataset that describes the computing environment the present disclosure, in some embodiments described herewithin, proposes accessing one or more sets of entity description records, computing a plurality of reliability scores and providing the plurality of reliability scores to one or more management software objects for the purpose of performing one or more management operations pertaining to management of the computing environment. Some examples of a management operation are removing at least one entity description record from the one or more sets of entity description records, and modifying at least one entity description record from the one or more sets of entity description records.

Optionally, each entity description record describes one of a plurality of entities of the computing environment and comprises a plurality of attribute values, each of one of a plurality of entity attributes. When the plurality of entities comprises a plurality of devices, an entity attribute may be a serial number of a device of the plurality of devices. Some other examples of an entity attribute include but are not limited to, a host-name of a device of the plurality of devices, a MAC address of a device of the plurality of devices, an internet protocol (IP) address of a device of the plurality of devices, a cloud identifier of a device of the plurality of devices, a manufacturer of a device of the plurality of devices, and an operating system of a device of the plurality of devices. When the plurality of entities comprises a plurality of users, an entity attribute may be a username of a user of the plurality of users. Some other examples of an entity attribute include, but are not limited to, an electronic mail address of a user of the plurality of users and an employee identification number of a user of the plurality of users.

Optionally, each of the plurality of reliability scores is computed for an attribute value of the plurality of attribute values of an entity description record of the one or more sets of entity description records. Optionally, a reliability score is computed by identifying one or more conflicts between the attribute value and one or more other attribute values of one or more other entity description records of the one or more sets of entity description records. The one or more conflicts may be identified according to the entity description record and the one or more other entity description records having one or more common entity attributes having one or more common attribute values, and one or more other common attributes having conflicting values.

Computing a reliability score for an attribute value allows identifying which values may be inaccurate or corrupt, increasing accuracy of a management operation performed by a software management object that uses the reliability score for the attribute value, compared to another management operation performed by the software management object without considering the reliability score for the attribute value.

Optionally, the score is computed for one of the one or more common attribute values, where an attribute value is equal in the entity description record and the one or more other entity description records when it should be different. For example, a serial number that is common between two or more entity description records having different hostname attribute values.

Optionally, the score is computed for one of the conflicting values, where an attribute value in the entity description record is different from another attribute value in the one or more other entity description records when it should be equal or equivalent. For example, an operating system value of the entity description record that is different from another operating system value of the one or more other entity description records, when a serial number in the entity description record is equal to another serial number in the one or more other entity description records.

Optionally, the conflicting values are of different attributes, where the entity description record and the one or more other entity description records have one or more common entity attributes with common values, but the entity description record has a first identified value for a first identified attribute and the one or more other entity description records have a second identified value for a second identified attribute, and the first identified value is in conflict with the second identified value.

Optionally, the score is computed according to an amount of entity description records having a common attribute value, for example when the amount of entity description records having a common attribute value exceeds an identified threshold value.

Optionally, identifying the one or more conflicts comprises computing a graph describing one or more connections among the plurality of entities of the computing environment. Optionally, the graph is computed using a plurality of entity description records of the one or more sets of entity description records, optionally according to common attribute values between entity description records. Optionally, the graph comprises a plurality of nodes, each representing one of the plurality of entities of the computing environment. Optionally, the graph comprises a plurality of edges, each representing one of the plurality of attribute values. Optionally, identifying the one or more conflicts between the attribute value and one or more other attribute values comprises identifying in the graph one or more conflicts between one or more edges representing the attribute value and one or more other edges representing one or more other attributes. Identifying connectivity in a graph structure is faster and more accurate than identifying connectivity by scanning the plurality of records, increasing accuracy of identifying connectivity between the plurality of entities and thus increasing accuracy of identifying the one or more conflicts. In addition, using a graph allows identifying sophisticated relationships between a plurality of connections between the plurality of entities that cannot be identified by scanning the plurality of records, further increasing accuracy of identifying the one or more conflicts.

In addition, in some embodiments described herewithin, the present disclosure proposes further providing the one or more management software object with one or more justification values explaining at least one of the plurality of reliability scores. To do so, the present disclosure proposes in such embodiments computing, for each of one or more reliability scores of the plurality of reliability scores, one or more justification values according to the one or more conflicts according to which the reliability score was computed. Optionally, providing the plurality of reliability scores to the one or more management software objects further comprises providing the one or more justification values. In an example, a justification value comprises an opcode indicative of a type of conflict of the one or more conflicts. Optionally, a justification value comprises free text describing the one or more conflicts. Optionally, a justification value comprises one or more references to one or more entity attributes of at least one entity description record and additionally one or more attribute values of the at least one entity description record.

In addition, in some embodiments described herewithin, the present disclosure proposes computing a classification for one or more of the plurality of reliability scores, optionally when performing the one or more management operations. Optionally, the classification is one of a plurality of reliability classes. For example, a reliability class may be "okay", "may be okay", "may be bad", "bad" and "very bad". Optionally, computing the classification is according to the one or more justification values. Optionally, the one or more management software objects perform the one or more management operations according to the classification.

Optionally, a management operation comprises displaying the plurality of scores to one or more users in a graphical user interface of the one or more management software objects. Optionally, the user may select one or more management operations to perform. Optionally, the user schedules execution of the one or more management operations.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
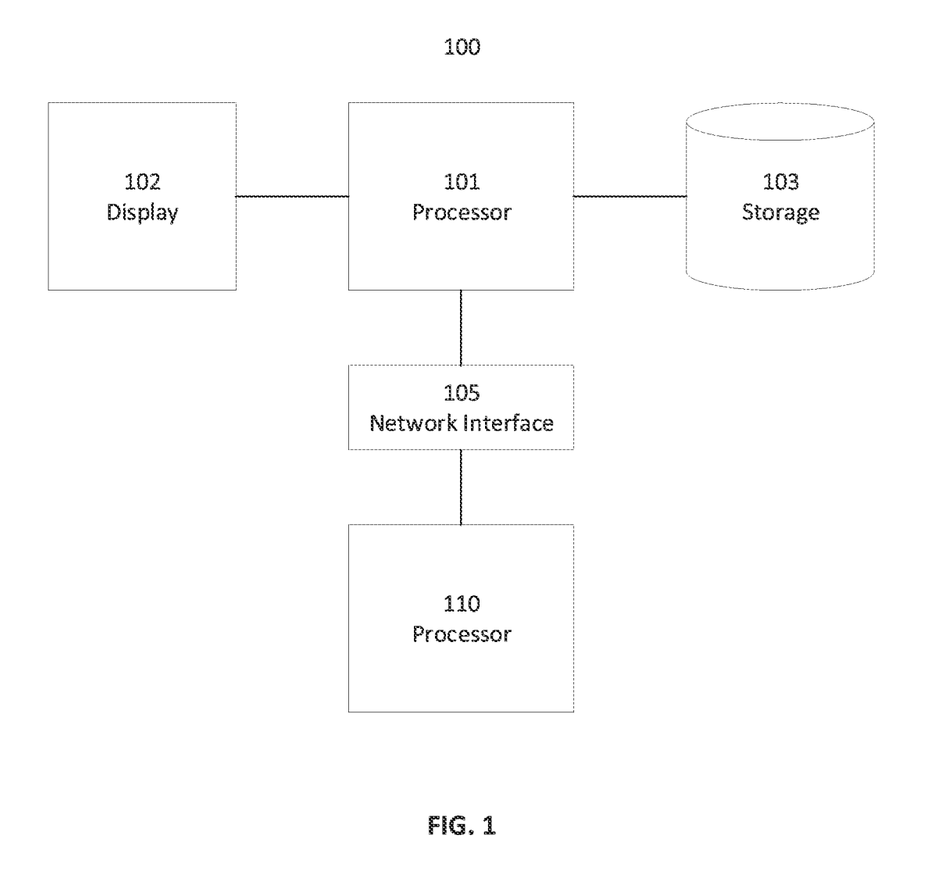
FIG. 1 is a schematic block diagram of an exemplary system, according to some embodiments.

Reference is now made to FIG. 1, showing a schematic block diagram of an exemplary system 100, according to some embodiments. In such embodiments, at least one hardware processor 101 is connected to at least one digital communication network interface 105. Optionally, at least one digital communication network interface 105 is connected to a local area network (LAN), some examples being an Ethernet network and a Wi-Fi network. Optionally, at least one digital communication network interface 105 is connected to a wide area network (WAN), some examples being a cellular network and the Internet.

For brevity, henceforth the term "processing unit" is used to mean "at least one hardware processor", and the terms are used interchangeably.

Optionally, the processing unit 101 is connected to other processing unit 110, optionally for accessing one or more sets of entity description records describing a plurality of entities of a computing environment. Optionally, the other processing unit 110 executes one or more system management entities of the computing environment. A virtual machine service manager or monitor such as VmWare ESXi or Amazon Web Services (AWS) is an example of a system management entity, for managing one or more virtual machines of the plurality of entities. Some other examples of a system management entity include, but are not limited to, McAffee ePolicy Orchestrator (ePO), Microsoft Active Directory, and a human resources management tool. Optionally, the processing unit 101 is connected to the other processing unit 110 via the at least one digital communication network interface 105.

Optionally, the processing unit 101 is connected to one or more non-volatile digital storage 103, optionally for storing the one or more sets of entity description records. Some examples of a non-volatile digital storage include a hard disk drive, a network connected storage and a storage network. Optionally the processing unit 101 is connected to the one or more non-volatile digital storage 103 via the at least one digital communication network interface 105.

Optionally, the processing unit 101 is connected to one or more display devices 102, optionally for displaying a graphical user interface (GUI) of one or more management software objects executed by the processing unit 101. Some examples of a display device include a computer screen and a monitor.

To produce a consistent dataset describing the computing environment, in some embodiments system 100 implements the following optional method.

Figure 2:
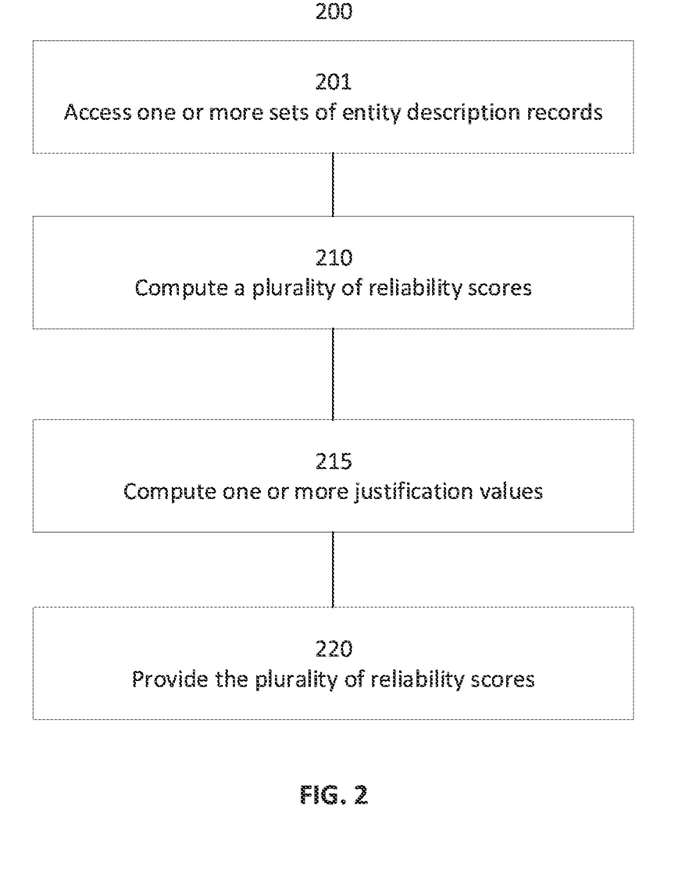
FIG. 2 is a flowchart schematically representing an optional flow of operations for producing a consistent dataset describing a computing environment, according to some embodiments.

Reference is now made also to FIG. 2, showing a flowchart schematically representing an optional flow of operations 200 for producing a consistent dataset describing a computing environment, according to some embodiments. In such embodiments, in 201 the processing unit 101 accesses one or more sets of entity description records.

For brevity, unless otherwise noted the term "record" is used to mean "entity description record", and the terms are used interchangeably. Optionally, each record of the plurality of records describes one of the plurality of entities of the computing environment. Optionally, the plurality of entities comprises a plurality of devices. Some example of a device are a computer, a network device, such as a router, and a virtual machine, executed by a host machine. Some additional examples of a device are a computer peripheral device, such as a printer, a digital storage device, and a nonstandard computing device that connects to a network and has an ability to transmit data (commonly known as an Internet Of Things device), such as a thermostat, a light bulb controller, and an electrical switch. Optionally, the plurality of entities comprises a plurality of users. Some examples of a user are an employee of an organization, a user of the computing environment and a manager of the computing environment.

Optionally, each record comprises a plurality of attribute values, each a value of one of a plurality of entity attributes. Some examples of an entity attribute include a serial number of a device of the plurality of devices, a host-name of a device of the plurality of devices, a MAC address of a device of the plurality of devices, an IP address of a device of the plurality of devices, a cloud identifier of a device of the plurality of devices, a manufacturer of a device of the plurality of devices, and an operating system of a device of the plurality of devices, a username of a user of the plurality of users an electronic mail address of a user of the plurality of users, a phone number of an a user of the plurality of users, and an employee identification number of a user of the plurality of users.

In 210, the processing unit 101 optionally computes a plurality of reliability scores, where each reliability score is computed for an attribute value of the plurality of attribute values of a record of the plurality of records. Optionally, a reliability score is a numerical value. Optionally, the reliability score is an enumerated value, selected from a list of enumerated score values.

Figure 3:
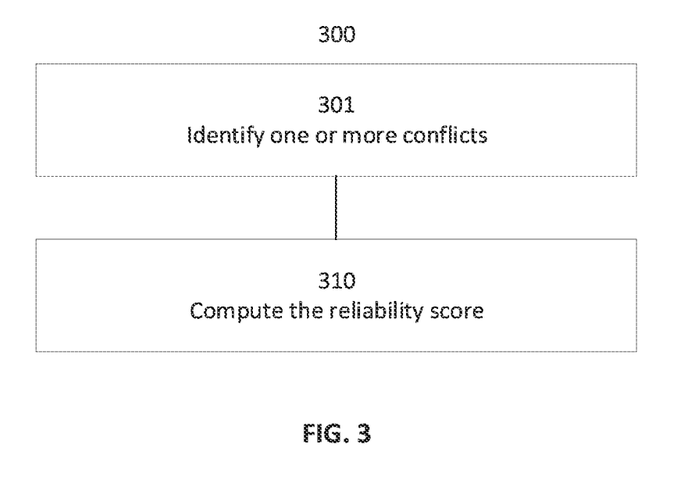
FIG. 3 is a flowchart schematically representing an optional flow of operations for computing a reliability score, according to some embodiments.

Reference is now made also to FIG. 3, showing a flowchart schematically representing an optional flow of operations 300 for computing a reliability score, according to some embodiments. In such embodiments, in 301 the processing unit 101 identifies one or more conflicts between the attribute value for which the reliability score is being computed and one or more other attribute values of one or more other records of the plurality of records.

Figure 4:
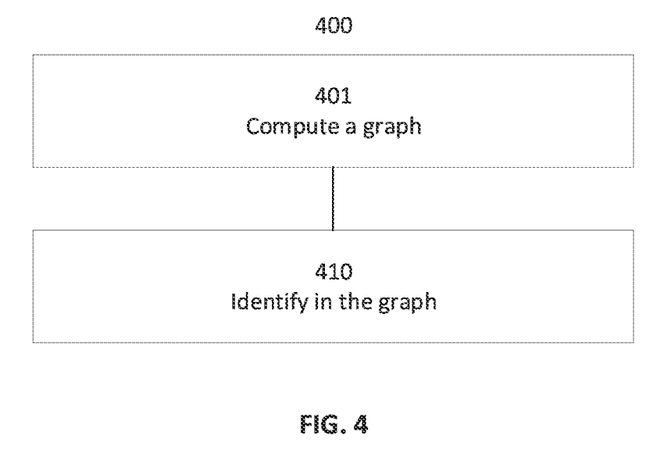
FIG. 4 is a flowchart schematically representing an optional flow of operations for identifying a conflict, according to some embodiments.

Optionally, the processing unit 101 uses a graph to identify the one or more conflicts. Optionally, the graph represents one or more connections among the plurality of entities according to common attributes having common attribute values. Reference is now made also to FIG. 4, showing a flowchart schematically representing an optional flow of operations 400 for identifying a conflict, according to some embodiments. In such embodiments, in 401 the processing unit 101 computes a graph comprising a plurality of nodes and a plurality of edges. Optionally, each of the plurality of nodes represents one of the plurality of entities. Optionally, each of the plurality of edges represents one of the plurality of attribute values.

Figure 5:
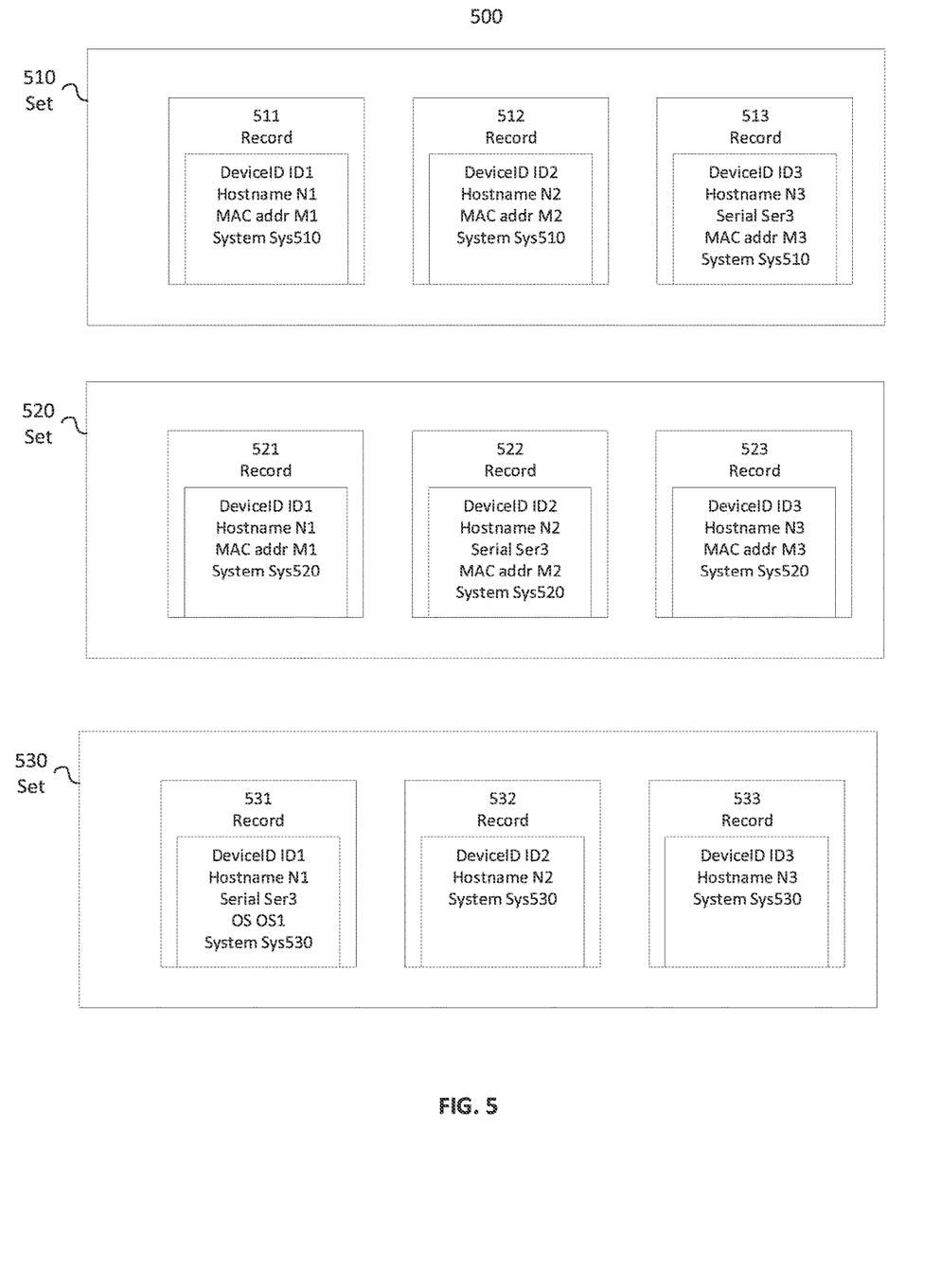
FIG. 5 is a schematic block diagram of an exemplary plurality of sets of entity description records, according to some embodiments.

Reference is now made also to FIG. 5, showing a schematic block diagram of an exemplary plurality of sets of entity description records 500, according to some embodiments. In this example, the computing system comprises three devices, identified as device ID1, device ID2 and device IDs. Also in the example, the one or more entity management systems managing the computing system comprise a first entity management system identified as system sys510, a second entity management system identified as system sys520, and a third entity management system identified as system sys530. Optionally, the processing unit 101 accesses one or more sets of records describing the plurality of entities, comprising set 510, set 520 and set 530. Optionally, the set 510 is retrieved from system sys510. Optionally, the set 520 is retrieved from system sys520. Optionally, the set 530 is retrieved from system sys530.

Optionally, the set 510 comprises record 511 describing device ID1, record 512 describing device ID2 and record 513 describing device ID3. Optionally, the set 520 comprises record 521 describing device ID1, record 522 describing device ID2 and record 533 describing device ID3. Optionally, the set 530 comprises record 531 describing device ID1, record 532 describing device ID2 and record 533 describing device ID3.

Optionally, each of a plurality of records of the one or more sets of records comprises one or more attribute values of one or more entity attributes.

Figure 6:
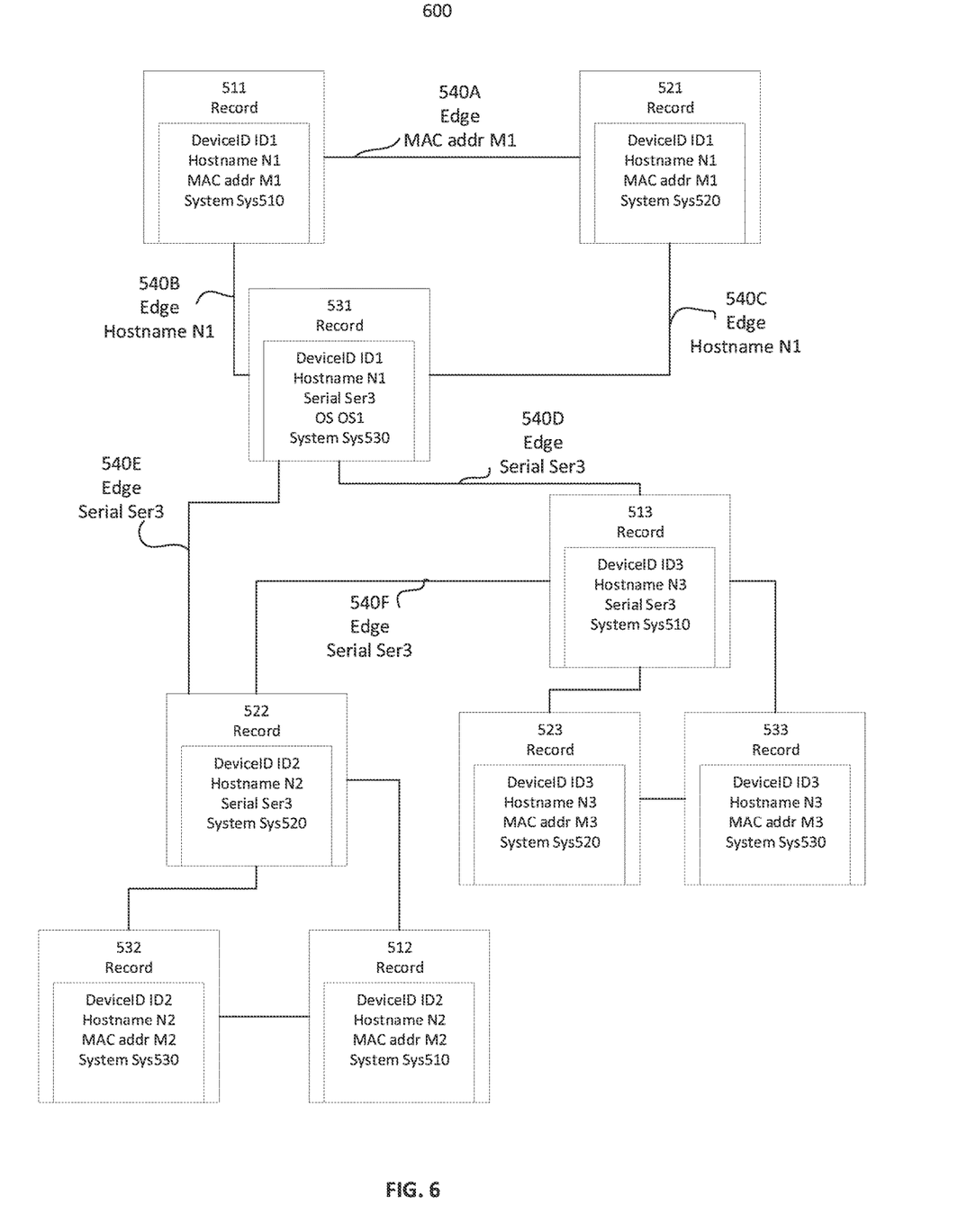
FIG. 6 is a schematic block diagram of an exemplary graph, according to some embodiments.

Optionally, the processing unit 101 computes the graph using the one or more sets of records. Reference is now made also to FIG. 6, showing an exemplary graph 600, according to some embodiments. In this example, each node is depicted by a record of the plurality of records, corresponding to the entity represented by the node. Thus, in this example, graph 600 comprises a plurality of nodes comprising record 511, record 521 and record 531, each representing device ID1, record 512, record 522 and record 532, each representing device ID2, and record 513, record 523 and record 533, each representing device ID3. Optionally, graph 600 comprises a plurality of edges comprising edge 540A, edge 540B, edge 540C, edge 540D, edge 540E and edge 540F, referenced collectively as plurality of edges 540. Optionally, each of the plurality of edges 540 represents one of the plurality of attribute values. In this example, the edge 540A represents the attribute value M1 of entity attribute MAC address, where the attribute value M1 is common to record 511 and record 521. Similarly, record 532 and record 512 may be connected by another edge of the plurality of edges 540 representing the attribute value M2 of the entity attribute MAC address, common to record 532 and record 512, and record 523 and record 533 may be connected by yet another edge of the plurality of edges 540 representing the attribute value M3 of the entity attribute MAC address, common to record 523 and record 533.

Further in this example, the edge 540B represents the attribute value N1 of entity attribute hostname, where the attribute value N1 is common to the record 511 and the record 531. Also in this example, the edge 540C represents the attribute value N1 of the entity attribute hostname, where the attribute value N1 is common to the record 521 and the record 531.

Also in this example, each edge 540D, edge 540E and edge 540F represents the attribute value SerS3 of entity attribute serial number, where the attribute value SerS3 is common to the record 531, the record 522 and the record 513.

Reference is now made again to FIG. 4. In 410, the processing unit 101 identifies one or more conflicts between one or more edges of the plurality of edges 540 representing an attribute value, and one or more other edges of the plurality of edges 540 representing another attribute value. Optionally, the one or more conflicts are identified according to connectivity among the plurality of entities, as represented by graph 600.

Making reference again to FIG. 6, the processing unit 101 may identify a conflict between the edge 540D, representing the attribute value S3 for both device ID1 and device ID3, and the edge 540C representing the attribute value N1 of device ID1 as found in record 531, but not of device ID3, as found in record 513.

The following description demonstrates the one or more conflicts as they are seen in graph 600, however the processing unit 101 may identify the one or more conflicts using the one or more sets of records comprising set 510, set 520 and set 530 without computing graph 600.

Optionally, the processing unit 101 identifies the one or more conflicts according to one or more common entity attributes, where the record and the one or more other records all have the one or more common entity attributes. Optionally, the record 531 and the record 513 have one or more first common entry attributes, for example comprising entry attribute Serial number, and have one or more second common entry attributes, for example comprising entry attributes device ID, hostname and system. Optionally, identifying the one or more conflicts comprises executing the following optional method.

Figure 7:
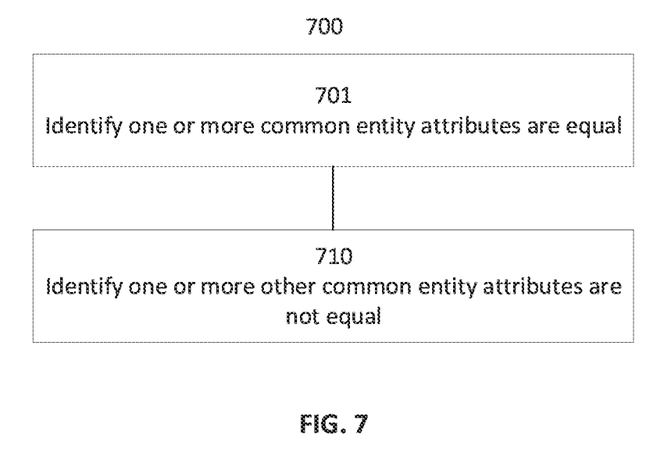
FIG. 7 is a flowchart schematically representing another optional flow of operations for identifying a conflict, according to some embodiments.

Reference is now made also to FIG. 7, showing a flowchart schematically representing another optional flow of operations 700 for identifying a conflict, according to some embodiments. In 701, the processing unit 101 optionally identifies that one or more first attribute values of the one or more first common entity attributes of record 531 are equal to one or more other first attribute values of the one or more first common entity attributes of one or more other records comprising record 513 and record 522, according to a first value comparison test. For example, the processing unit 701 optionally identifies that attribute value S3 of attribute Serial in record 531 is equal to attribute value S3 of attribute Serial in record 513 and to attribute value S3 of attribute Serial in record 522.

In 710, the processing unit 101 optionally identifies that one or more second attribute values of the one or more second common entity attributes of record 531 are not equal to one or more other second attribute values of the one or more second common entity attributes of record 513, according to a second value comparison test. For example, the processing unit 701 optionally identifies that attribute value N1 of attribute hostname in record 531 is not equal to attribute value N3 of attribute hostname in record 513.

Optionally, the first value comparison test comprises one or more textual comparisons. Optionally, the first value comparison test comprises one or more numerical comparisons. Optionally, the first value comparison test comprises one or more first threshold values. Optionally, the first value comparison test comprises one or more range of values. Optionally, the second value comparison test comprises one or more other textual comparisons. Optionally, the second value comparison test comprises one or more other numerical comparisons. Optionally, the second value comparison test comprises one or more second threshold values. Optionally, the second value comparison test comprises one or more other range of values.

Optionally, the reliability score is computed for a value of the one or more first entity attributes, for example the reliability score may be computed for the attribute value Ser3 of the entity attribute Serial of record 531.

Optionally, the reliability score is computed for another value of the one or more second entity attributes, for example the reliability score may be computed for the attribute N3 of the entity attribute hostname of the record 513.

Optionally, the processing unit 101 identifies that too many records share a common attribute value of an entity attribute, i.e. that an amount of records of the one or more other records exceeds an identified threshold value. For example, the processing unit 101 may identify that the one or more other records comprising record 513 and record 512 have an amount of records of two records, which exceeds an exemplary identified threshold value of 0 for sharing an attribute value of the entity attribute Serial. The identified threshold value may be greater than 0. In another example, a hostname value of an entity attribute hostname identified with two or more values of the entity attribute Serial may have a poor reliability score. In yet another example, a serial number value of an entity attribute Serial identified with four or more hostname values of the entity attribute hostname may have a poor reliability score. In an additional example, a MAC address value of an entity attribute MAC address identified with two or more operating system values of an entity attribute operating system may have a poor reliability score.

Optionally, after computing one or more reliability scores for one or more attribute values of an identified entity attribute, the processing unit 101 computes one or more other reliability scores for one or more additional attribute values of another identified entity attribute. For example, after computing one or more reliability scores for one or more serial number values of the entity attribute Serial, optionally identifying one or more bad serial number values, the processing unit 101 may compute one or more other reliability scores for one or more hostname values of the entity attribute hostname, optionally identifying one or more bad hostname values. Optionally, the processing unit 101 uses the one or more reliability scores when computing the one or more other reliability scores, for example ignoring the one or more bad serial number values when computing the one or more other reliability scores for the one or more hostname values. Cascading computation of the plurality of reliability values according the entity attribute increases accuracy of the plurality of reliability scores by reducing an amount of times an attribute value having a poor reliability score is used.

Optionally, the processing unit 101 uses graph 600 when executing the method 700. Optionally, the processing unit 101 executes method 701 without using graph 600.

Reference is now made again to FIG. 3. Optionally, in 301 the processing unit 101 identifies the one or more conflicts according to at least two entity attributes that are not common to the record and the one or more other records, in addition to the one or more common entity attributes. For example, the processing unit 101 may compute a score for an attribute value that is a third attribute value of a third entity attribute of a first record of the one or more other records, for example value N3 of the entity attribute hostname of record 513. Optionally, one of the one or more other attribute values is a fourth attribute value of a fourth entity attribute of a second record of the one or more other records, for example attribute value OS1 of the entity attribute Operating System of record 531. Optionally, identifying the one or more conflicts comprises the processing unit 101 identifying that the one or more first attribute value in the record is equal, according to the first value comparison test, to one or more other attribute values of the one or more first common entity attributes in each of the one or more other records. For example, the processing unit 101 may identify that the value Ser3 of the entity attribute Serial in the record 531 is equal to the entity attribute Serial in the record 513 and in the record 512. Optionally, identifying the one or more conflicts comprises the processing unit 101 identifying a conflict between the third attribute value and the fourth attribute value, according to a third value comparison test. For example, the processing unit 101 may identify that value N3 in record 513 conflicts with the value OS1 in the record 522. Optionally, the third value comparison test comprises the third entity attribute, the third attribute value, the fourth entity attribute and the fourth attribute value.

In 310, the processing unit 101 optionally computes the reliability score according to identifying the one or more conflicts.

Reference is now made again to FIG. 2. Optionally, in 215 the processing unit 101 computes one or more justification values according to the one or more conflicts. Optionally, for each of at least one of the plurality of reliability scores, computing the reliability score further comprises computing the one or more justification value according to the one or more conflicts according to which the reliability score was computed. Optionally, a justification value comprises free text describing the one or more conflicts. Optionally, a justification value comprises a reference to one or more attribute values in one or more records. Optionally, a justification value comprises an opcode indicative of a type of conflict.

In 220, the processing unit 101 optionally provides the plurality of reliability scores to one or more management software objects, for the purpose of performing one or more management operations pertaining to management of the computing environment. Optionally, the processing unit 101 executes at least some of the one or more management software objects. Optionally, at least some other of the one or more management software objects are executed by yet another processing unit (not shown). Optionally, providing the plurality of reliability scores to the one or more management software objects further comprises providing the one or more justification values in association with the reliability score for which they were computed.

Some examples of a management operation include removing one or more records from the one or more sets of records and modifying one or more other records in the one or more sets of records. Some examples of modifying a record include editing a value of the record, adding a value to the record, deleting a value from the record, and replacing the record.

Optionally, the processing unit 101 has access to a repository comprising a plurality of descriptors, each describing one of the plurality of entities of the computing system. Another example of a management operation is splitting one or more of the entity descriptors into two or more entity descriptors. Optionally, the two or more entity descriptors comprise a first entity descriptor describing a first entity of the plurality of entities and a second entity descriptor describing a second entity of the plurality of entities.

Yet other examples of a management operation include, but are not limited to, modifying one or more system values of one or more devices of a plurality of devices of the plurality of entities, displaying the plurality of reliability scores on one or more users in a GUI of the one or more management software object, and sending one or more alerts to one or more other users.

Optionally, the GUI is displayed on one or more display device 102.

Optionally, displaying the plurality of reliability scores comprises displaying for at least one of the plurality of reliability scores one or more display values, for example the reliability score. Other examples of a display value include an attribute value for with the reliability score was computed, the entity attribute of the attribute value, and a justification value associated with the reliability score.

Optionally, performing a management operation comprises providing the one or more users an interface to select at least one other of the one or more display values. Optionally, performing a management operation comprises providing the one or more users an interface to select the one or more management operations to perform.

Optionally, performing a management operation is in response to user selection. Optionally, the one or more management operations additionally or alternatively comprise one or more of: generating a query comprising the one or more other display value, storing the query, for example in at least one digital storage 103, and instructing execution of an identified script. Optionally, the user configures a schedule for performing the one or more management operations.

Optionally, performing the one or more management operations comprises computing a classification for at least one of the plurality of reliability scores. Optionally the classification is one of a plurality of reliability classes. Optionally the classification is indicative of a severity of the one or more conflicts. Optionally, the classification is indicative of an impact the attribute value has on management of the computing system, for example an amount of management operations that cannot be performed due to the attribute value. For example, a conflict in memory addresses may be classified as indicative of an impact that is higher than an impact of a conflict in serial number. Optionally, the classification is computed according to the one or more justification values.

Optionally, the one or more management software objects performs the one or more management operations according to a classification of one or more reliability scores of one or more attribute values of the plurality of attribute values of one or more records of the plurality of records. Optionally, performing the one or more management operation is in response to the classification meeting one or more criteria, for example when the classification is a member of an identified set of critical classifications. Optionally, the one or more management operations are selected according to the classification.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant entities and entity attributes will be developed and the scope of the terms "entity" and "entity attribute" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for producing a consistent dataset describing a computing environment, comprising:
    accessing, by at least one processor, at least one set of entity description records stored in a non-volatile storage device operating as a repository, wherein each entity description record describing one of a plurality of entities of a computing environment and comprising a plurality of attribute values each of one of a plurality of entity attributes;
    computing, by the at least one processor, a plurality of reliability scores, each reliability score is computed for an attribute value of a respective one of the plurality of attribute values of an entity description record of the at least one set of entity description records, said reliability score represents a level of accuracy and correctness of a respective attribute value, by:
        identifying at least one conflict between the attribute value and at least one other attribute value of at least one other entity description record, wherein a conflict is defined as:
            when a first entity attribute is a first common entity attribute to a certain entity description record and at least one other entity description record and a value of said first common entity attribute is similar in said certain entity description record and said at least one other entity description record, and
            a second entity attribute is a second common attribute to said certain entity description record and said at least one other entity description record and a value of said second common entity attribute is different between said certain description record and at least one of said at least one other entity description record; and
        computing the reliability score according to identifying the at least one conflict;
    providing, by said at least one processor, over a communication network, the plurality of reliability scores to at least one management software object executed by at least one other processor; and
    performing, by said at least one other processor at least one management operation pertaining to management of the computing environment, wherein the at least one management operation comprises at least one of:
        accessing said repository stored in said non-volatile storage device and removing at least one entity description record from the at least one set of entity description records, and
        accessing said repository stored in said non-volatile storage device and modifying at least one other entity description record in the at least one set of entity description records.

2. The method of claim 1, wherein identifying the at least one conflict comprises:
    computing a graph comprising a plurality of nodes and a plurality of edges, where each of the plurality of nodes represents one of at least one entity description record of one of the plurality of entities of the computing environment and each of the plurality of edges connects two nodes which represent entity description records having a same attribute value of a common attribute for the two respective entity description records; and
    identifying in the graph at least one conflict between at least one edge of the plurality of edges representing the attribute value and at least one other edge of the plurality of edges representing the at least one other attribute value.

3. The method of claim 1, wherein computing the reliability score is further computed according to a number of entity description records of the at least one other entity description records having a common attribute value and whether said number exceeds an identified threshold value.

4. The method of claim 1, wherein the plurality of entities comprises a plurality of devices; and
    wherein the at least one first common entity attribute comprises at least one of: a serial number of a device of the plurality of devices, a host-name of a device of the plurality of devices, a media access control (MAC) address of a device of the plurality of devices, an internet protocol (IP) address of a device of the plurality of devices, a cloud identifier of a device of the plurality of devices, and an operating system of a device of the plurality of devices.

5. The method of claim 1, wherein the plurality of entities comprises a plurality of devices; and
    wherein the at least one second common entity attribute comprises at least one of: a serial number of a device of the plurality of devices, a host-name of a device of the plurality of devices, a manufacturer of a device of the plurality of devices, a MAC address of a device of the plurality of devices, an IP address of a device of the plurality of devices, a cloud identifier of a device of the plurality of devices, and an operating system of a device of the plurality of devices.

6. The method of claim 1, wherein the plurality of entities comprises a plurality of users; and
    wherein the at least one first common entity attribute comprises at least one of: a username of a user of the plurality of users, an electronic mail address of a user of the plurality of users, and an employee identification number of a user of the plurality of users.

7. The method of claim 1, wherein the plurality of entities comprises a plurality of users; and
wherein the at least one second common entity attribute comprises at least one of: a username of a user of the plurality of users, an electronic mail address of a user of the plurality of users, and an employee identification number of a user of the plurality of users.

8. The method of claim 1, wherein performing the at least one management operation comprises computing a classification for at least one of the plurality of reliability scores, where the classification is one of a plurality of reliability classes, each describing a pre-defined level of accuracy and correctness of a respective attribute value.

9. The method of claim 1, wherein for each of at least one of the plurality of reliability scores, computing the reliability score further comprises computing at least one justification value according to the at least one conflict according to which the reliability score was computed, said at least one justification value provides an explanation for the computed reliability score; and
wherein providing the plurality of reliability scores to the at least one management software object further comprises providing the at least one justification value in association with the reliability score.

10. The method of claim 9, wherein performing the at least one management operation comprises computing a classification of at least one of the plurality of reliability scores, where the classification is one of a plurality of reliability classes, each describing a pre-defined level of accuracy and correctness of a respective attribute value; and
wherein computing the classification is further according to the at least one of the plurality of reliability scores is further according to the one or more justification values associated with the at least one reliability score.

11. The method of claim 1, wherein the at least one management operation further comprises at least one of:
in a repository comprising a plurality of entity descriptors, each describing one of the plurality of entities of the computing environment, splitting at least one of the entity descriptors into at least two entity descriptors comprising one entity descriptor describing a first entity of the plurality of entities and another entity descriptor describing a second entity of the plurality of entities;
displaying the plurality of reliability scores to at least one user in a graphical user interface of the at least one management software object;
sending at least one alert to at least one other user;
modifying at least one system value of at least one device of a plurality of devices of the plurality of entities; and
generating a report comprising at least some of the plurality of reliability scores.

12. The method of claim 11, wherein for at least one of the plurality of reliability scores displaying the reliability score comprises displaying one or more display values, where at least one of the one or more display values is selected from: the reliability score, the attribute value for which the reliability score was computed, the entity attribute of the attribute value, and a justification value associated with the reliability score; and
wherein performing the at least one management operation further comprises providing the at least one user with an interface to:
select at least one other of the one or more display values; and
select the at least one management operation.

13. The method of claim 12, wherein the at least one management operation additionally or alternatively comprises at least one of:
generating a query comprising the at least one other display value;
storing the query; and
instructing execution of an identified script.

14. The method of claim 8, wherein the at least one management operation is performed according to the classification of at least one reliability score of at least one attribute value of the plurality of attribute values of at least one entity description record of the plurality of entity description records.

15. The method of claim 1, wherein accessing the at least one set of entity description records comprises accessing at least one system management entity of the computing environment.

16. A system for producing a consistent dataset describing a computing environment, comprising:
at least one hardware processor configured for:
accessing at least one set of entity description records stored in a non-volatile storage device operating as a repository, wherein each entity description record describing one of a plurality of entities of a computing environment and comprising a plurality of attribute values each of one of a plurality of entity attributes;
computing a plurality of reliability scores, each reliability score is computed for an attribute value of a respective one of the plurality of attribute values of an entity description record of the at least one set of entity description records, said reliability score represents a level of accuracy and correctness of a respective attribute value, by:
identifying at least one conflict between the attribute value and at least one other attribute value of at least one other entity description record, wherein a conflict is defined as:
when a first entity attribute is a first common entity attribute to a certain entity description record and at least one other entity description record and a value of said first common entity attribute is similar in said certain entity description record and said at least one other entity description record, and
a second entity attribute is a second common attribute to said certain entity description record and said at least one other entity description record and a value of said second common entity attribute is different between said certain description record and at least one of said at least one other entity description record; and
computing the reliability score according to identifying the at least one conflict; and
providing, over a communication network, the plurality of reliability scores to at least one management software object executed by at least one other processor; and
the at least one other processor, configured for:
receiving over said communication network said plurality of reliability scores; and
executing the at least one management software object and performing the at least one management operation pertaining to management of the computing environment, wherein the at least one management operation comprises at least one of:
- accessing said repository stored in said non-volatile storage device and removing at least one entity description record from the at least one set of entity description records, and
- accessing said repository stored in said non-volatile storage device and modifying at least one other entity description record in the at least one set of entity description records.

17. A software program product for producing a consistent dataset describing a computing environment, comprising:
- a non-transitory computer readable storage medium;
- first program instructions for accessing at least one set of entity description records stored in a non-volatile storage device operating as a repository, wherein each entity description record describing one of a plurality of entities of a computing environment and comprising a plurality of attribute values each of one of a plurality of entity attributes;
- second program instructions for computing a plurality of reliability scores, each reliability score is computed for an attribute value of a respective one of the plurality of attribute values of an entity description record of the at least one set of entity description records, said reliability score represents a level of accuracy and correctness of a respective attribute value, by:
  - identifying at least one conflict between the attribute value and at least one other attribute value of at least one other entity description record, wherein a conflict is defined as:
    - when a first entity attribute is a first common entity attribute to a certain entity description record and at least one other entity description record and a value of said first common entity attribute is similar in said certain entity description record and said at least one other entity description record, and
    - a second entity attribute is a second common attribute to said certain entity description record and said at least one other entity description record and a value of said second common entity attribute is different between said certain description record and at least one of said at least one other entity description record; and
  - computing the reliability score according to identifying the at least one conflict; and
- third program instructions for providing, over a communication network, the plurality of reliability scores to at least one management software object executed by at least one other processor which performs at least one management operation pertaining to management of the computing environment, wherein the at least one management operation comprises at least one of:
- accessing said repository stored in said non-volatile storage device and removing at least one entity description record from the at least one set of entity description records, and
- accessing said repository stored in said non-volatile storage device and modifying at least one other entity description record in the at least one set of entity description records;
- wherein the first, second, and third program instructions are executed by at least one computerized processor from the non-transitory computer readable storage medium.

* * * * *